United States Patent [19]

Harrer et al.

[11] Patent Number: 5,421,453
[45] Date of Patent: Jun. 6, 1995

[54] COMPACT DISC PACKAGE

[75] Inventors: Jill L. Harrer; David E. Bade, both of Oakdale; Gregory W. Newman, Inver Grove Heights; Richard A. Stehura; Mark A. Arps, both of Woodbury, all of Minn.

[73] Assignee: Minnesota Mining and Manufacturing Company, St. Paul, Minn.

[21] Appl. No.: 201,668

[22] Filed: Feb. 25, 1994

[51] Int. Cl.⁶ ............................................. B65D 85/57
[52] U.S. Cl. ................................. 206/312; 206/310
[58] Field of Search .................... 206/310, 311, 312

[56] References Cited

U.S. PATENT DOCUMENTS

| 911,794 | 2/1909 | Williams . | |
|---|---|---|---|
| 1,292,264 | 1/1919 | Coulson et al. . | |
| 1,463,413 | 7/1923 | Wilburger . | |
| 2,333,798 | 11/1943 | Kner | 229/68 |
| 2,512,577 | 6/1950 | Franck | 229/68 |
| 2,636,312 | 4/1953 | Martin | 46/11 |
| 3,116,005 | 12/1963 | Skaggs | 229/40 |
| 3,303,603 | 7/1963 | Abeson | 46/11 |
| 3,361,322 | 1/1968 | Gabriel et al. | 229/14 |
| 3,556,391 | 1/1971 | Kosterka | 229/68 |
| 3,717,297 | 2/1973 | Perry | 229/52 |
| 3,870,223 | 3/1975 | Wyant | 229/72 |
| 4,325,507 | 4/1982 | Janhonen | 229/55 |
| 4,473,153 | 9/1984 | Colangelo | 206/312 |
| 4,620,630 | 11/1986 | Moss | 206/45.24 |
| 4,640,413 | 2/1987 | Kaplan et al. | 206/232 |
| 4,653,639 | 3/1987 | Traynor | 206/444 |
| 4,694,954 | 9/1987 | Moss | 206/45.26 |
| 4,709,812 | 12/1987 | Kosterka | 206/310 |
| 4,905,831 | 3/1990 | Bagdis et al. | 206/444 |
| 5,088,599 | 2/1992 | Mahler | 206/313 |
| 5,101,973 | 4/1992 | Martinez | 206/312 |
| 5,119,933 | 6/1992 | Taylor | 206/232 |
| 5,205,405 | 4/1993 | O'Brien et al. | 206/310 |
| 5,219,417 | 6/1993 | O'Brien et al. | 206/312 |
| 5,248,032 | 9/1993 | Sheu et al. | 206/312 |
| 5,289,918 | 3/1994 | Dobias et al. | 206/312 |

Primary Examiner—David T. Fidei
Attorney, Agent, or Firm—Gary L. Griswold; Walter N. Kirn; David B. Kagan

[57] ABSTRACT

A compact disc package made of double paneled paper board and including a base panel assembly and a cover panel assembly that are joined by an edge panel and will fold to overlie each other and to open by hinging at the edge panel. The base panel assembly formed such that the double walls of the base panel assembly are unattached in corner portions of such panel assembly and slots are provided to permit access to a space between the double walls. An insert, which is slightly smaller than the base panel assembly, is flexible such that its corner portions can be inserted through the slots into the spaces between the walls of the inner and outer base panels. The insert includes retainers for holding a compact disc in position on the base panel assembly while the cover panel assembly is hinged over the insert and a compact disc on the insert.

15 Claims, 4 Drawing Sheets

COMPACT DISC PACKAGE

CROSS REFERENCE TO RELATED APPLICATION

Reference is made to copending U.S patent application Ser. No. 08/152,467 filed Nov. 12, 1993 entitled DUAL DISC ADAPTER, and application Ser. No. 08/20/575 filed on even date herewith entitled COMPACT DISC PACKAGE WITH BI-FOLD PANELS, both assigned to the Assignee of this application.

BACKGROUND OF THE INVENTION

The present invention relates to a separable holder for a compact disc and a paper board package which is made of recyclable materials that encloses, supports, and protects the compact disc.

Compact discs are used for a wide variety of different applications, including storing digitally recorded music, and for read only memory (ROM) devices for computers. Traditionally the discs are packaged in an all plastic boxes, known as a "jewel boxes", which are fragile and not easily shipped, and require special efforts to recycle.

A recent development for packaging is a flexible clear plastic adapter insert that holds a compact disc supported on a center hub and at the disc. The adapter insert mounts in a recyclable paper board package in the present invention.

Compact discs have been packaged in paper board jackets, but generally the jackets form a sleeve or chamber which has one open edge through which a compact disc can be slid into the interior chamber. Paper board jackets have the advantages of being recyclable, inexpensive, light weight, and easily mailable, as well as being easily printed. A paper board compact disc jacket is shown in U.S. Pat. No. 5,248,032. A compact disc holder and a package for the disc holder are shown in U.S. Pat. No. 5,205,405. A substantial number of panels are used for forming the jacket.

SUMMARY OF THE INVENTION

The compact disc package of the present invention is made of paper board panels and receives and holds a compact disc, preferably, as shown, on a separable flexible plastic insert or holder. The insert or holder is retained in the package by pockets formed in the corners of a base panel assembly which receive the corners of the flexible insert and retain the insert in position. A compact disc can be placed onto the insert, when placed on the base panel assembly and a cover panel assembly folded over the base panel assembly, the insert and a compact disc held on the insert. The package has double panels of paper board on both sides of the disc to provide adequate rigidity for protection, and also for simplicity of printing. The cover can be opened in the manner of a book to provide access to the compact disc support held on the base panel assembly for ease of insertion and removal.

The double panels of the cover form a large pocket which will retain informational booklets and brochures easily by slipping one cover of the booklet into the pocket. If desired, booklets can be glued to the inside of the package cover. The large pocket in the cover also can be used for retaining a second compact disc.

The paper board jacket is made of materials that can be recycled, and the plastic insert is separable from the package so recycling is simplified. The package can be made at relatively low cost and used with a wide range of compact discs. Further, the cover and base panel assemblies are formed of folded panels that are held together easily and reliably.

The package is generally shrink wrapped for handling and is easily mailed.

DETAILED DESCRIPTION OF THE PREFERRED EMBODIMENTS

Figure 1:
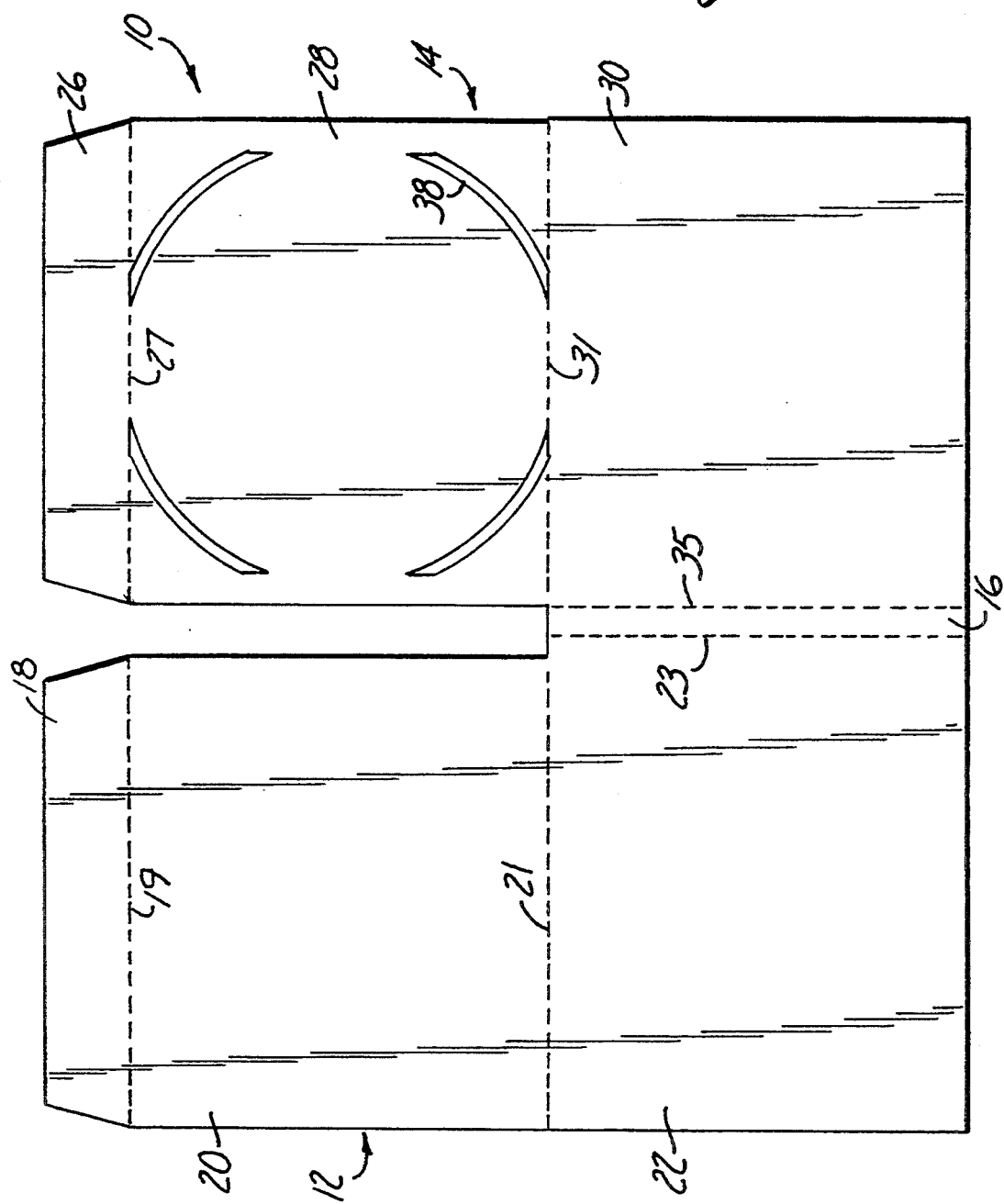
FIG. 1 is a flat layout of the compact disc package made according to the present invention.

A flat layout or blank 10 of paper board after it has been die cut for the package of the present invention is illustrated. The flat blank 10 is made up of a plurality of single thickness panels and flaps joined by lines that are scored for ease of folding. It is to be understood that the term fold line means a line has been scored so that the two panels joined at the fold line can be folded relative to each other. The compact disc blank includes a cover section indicated generally at 12 and a base section indicated generally at 14. The cover section 12 and the base section 14 are joined together with an edge panel 16. The cover section 12 includes a flap 18, an inner cover panel 20, and an outer cover panel 22. The flap 18 is joined to the inner cover panel along a scored fold line 19, and the inner and outer cover panels are joined together along a scored fold line 21.

The outer cover panel 22 is joined to one side of the edge panel 16 along a scored fold line 23.

The base section 14 includes a flap 26, an inner base panel 28, that is joined to the flap 26 along a scored fold line 27, and an outer base panel 30 joined to the inner base panel 28 along a scored fold line 31. One edge of the outer base panel 30 is joined to an edge of the edge panel 16 along a scored fold line 35.

The inner base panel 28 is rectangular as shown in FIG. 1 and is provided with four part circular slots 38 adjacent the corners thereof, as shown. The part circular slots 38 are formed by removing portions of the paper board stock to leave pocket forming sections 40 in the corners of the inner base panel 28. The pocket forming sections 40 do not have to be at corners, but as will be seen, the corner areas are convenient with a rectilinear periphery.

To form the compact disc package from blank 10, the flap 18 is folded over onto the inner cover panel 20 along the fold line 19, and then the inner cover panel 20 is folded along fold line 21 to overlie the outer cover panel 22. The flap 18 is folded back upon the inner cover panel so that the flap overlies the inner surface of the outer cover panel 22 generally shown by the dotted lines in FIG. 1. The flap 18 is then glued to the inner surface of the outer cover panel to form a double layer cover panel assembly 29. (See FIGS. 2 and 5.)

Figure 2:
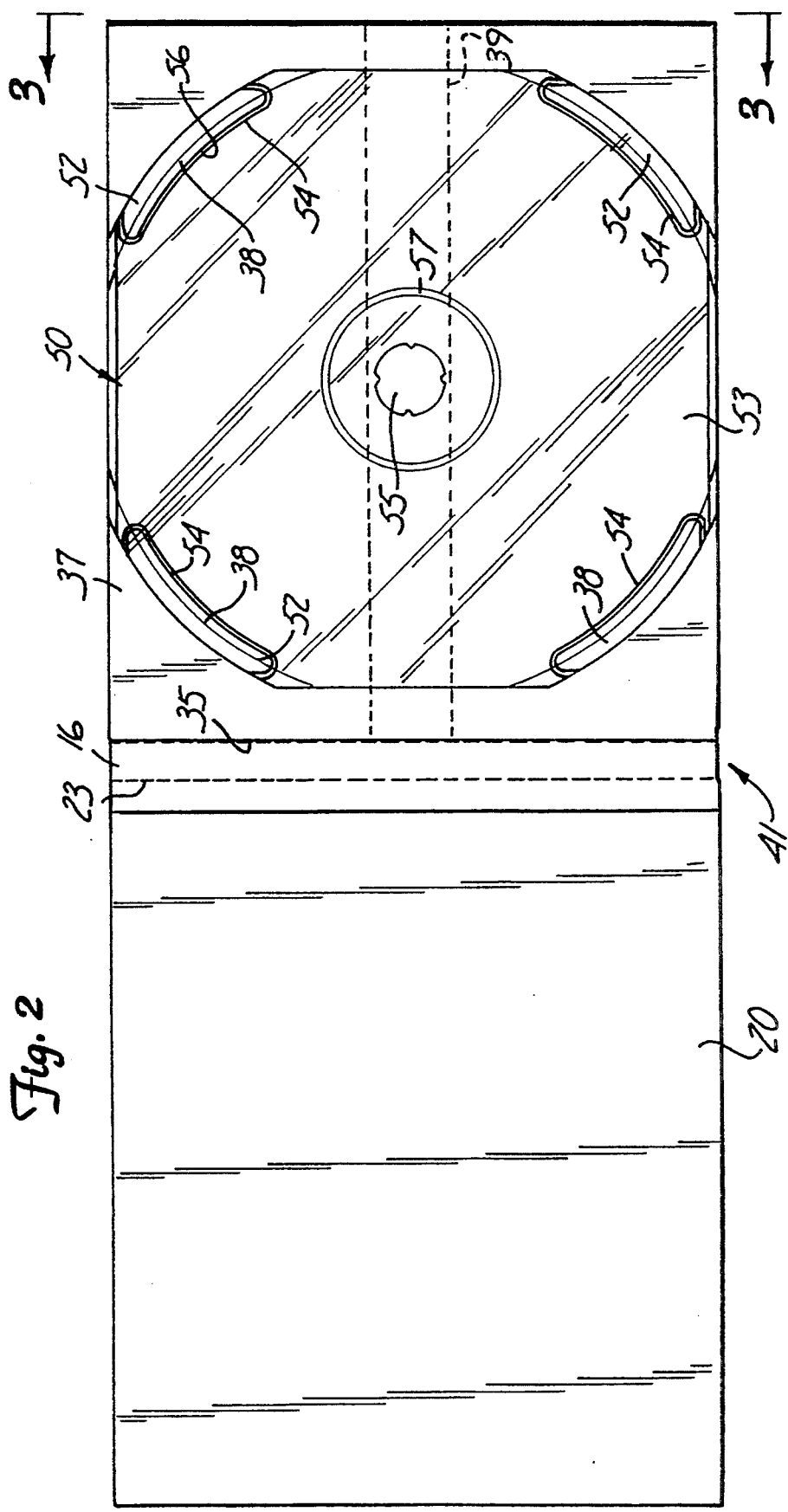
FIG. 2 is a top plan view of a formed base panel assembly and cover panel assembly with a flexible compact disc insert shown in position on the base panel assembly.
Figure 3:
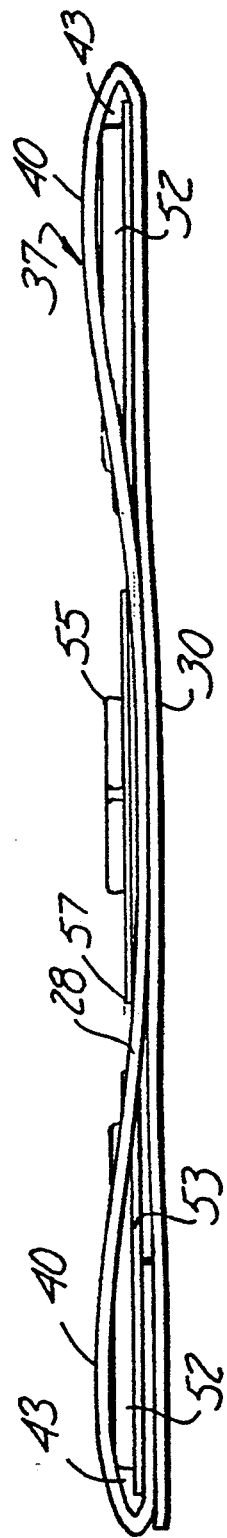
FIG. 3 is a view taken along line 3—3 in FIG. 2.
Figure 5:
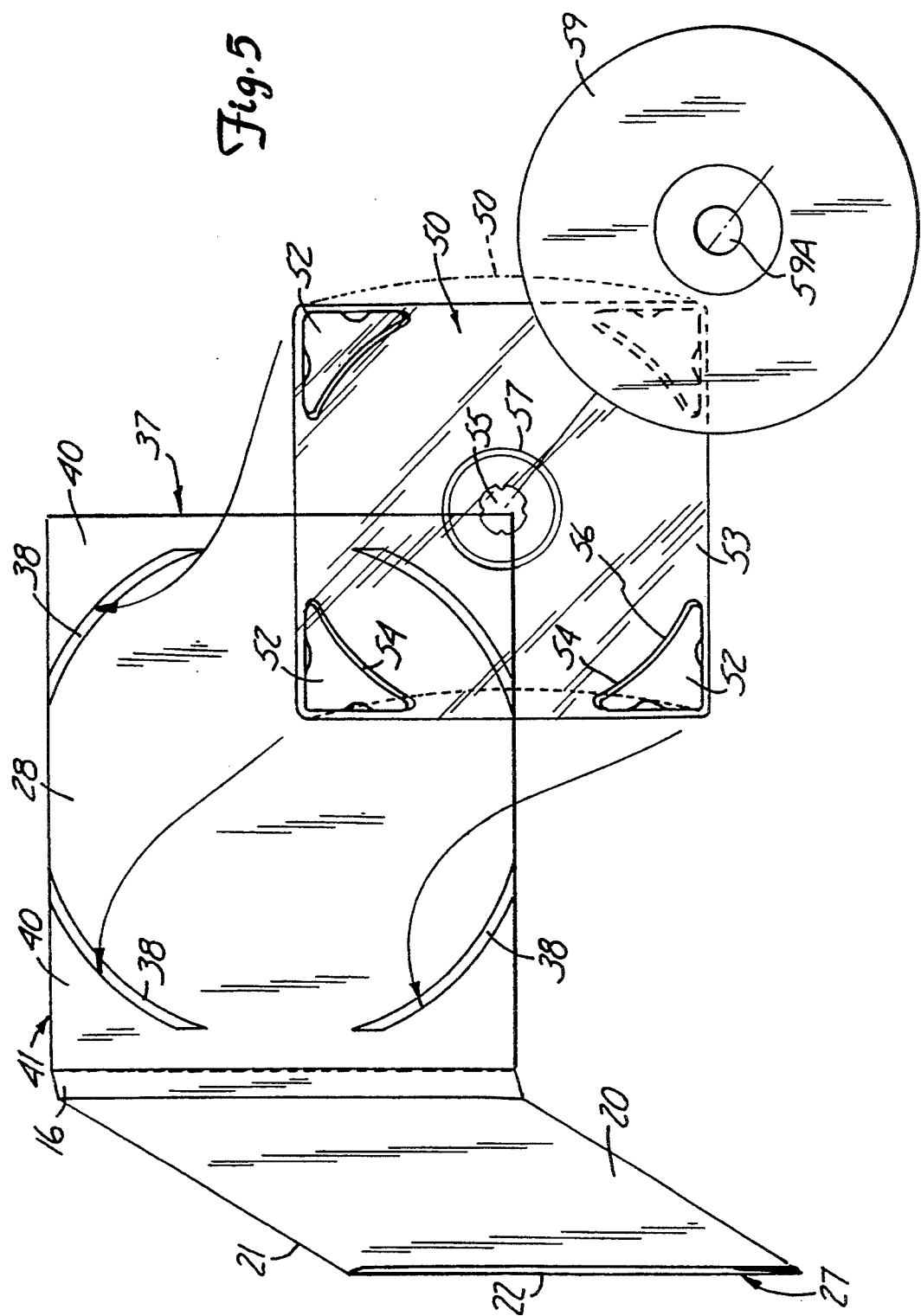
FIG. 5 is an exploded perspective view of a compact disc package made according to the present invention shown in a partially opened position and illustrating an insert.

The blank 10 is then further formed by folding the flap 26 along the scored fold line 27 to overlie the inner surface of the inner base panel 28, and then the inner base panel 28 is folded along scored fold line 31 to overlie the outer base panel 30. The surface of flap 26 facing the outer base panel is then glued against the inner surface of the outer base panel 30 to form a base panel assembly 37 as shown in FIGS. 2, 3, 5. The center portions of the inner base panel 28 are also glued to the inner surface of the outer base panel 30 generally in the region between dotted lines shown in FIG. 2. Spots of glue will be used in desired locations. This will hold the two single thickness panels securely together to form a double panel paper board base panel assembly 37, and the double panel paper board cover panel assembly 29. After folding, the under surface of inner cover panel 20 and inner base 28 of the blank 10 of FIG. 1 are facing upwardly in FIG. 2.

Referring to FIG. 2, where the individual panels are folded to form the base panel assembly 37 and cover panel assembly 29, the inner base and cover panels are shown with the compact disc package 41 open. It can be seen in FIGS. 2 and 3 that the part circular slots 38 open to pockets or recessed chambers 43 under pocket forming sections 40 of the inner base panel 28 even when center portions of the inner base panel 28 are secured to the inner surface of the outer base panel 30. The pocket forming sections 40 form the pockets 43 between the inner base panel 28 and the outer base panel 30.

Referring to FIGS. 2 and 5 in particular, a compact disc holding insert 50 as shown is made generally with a rectangular periphery slightly smaller than the base panel assembly, and has corner bosses 52 that are raised up out of the general plane of a main flat insert panel 53. The bosses 52 will fit through the slots 38 and into the pockets 43 formed under the pocket forming sections 40 between the inner base panel 28 and the outer base panel 30 in the corner regions.

The raised corner bosses 52 at the four corners of the insert 50 have inner part circular surfaces shaped to define a central region for receiving a compact disc 59 (FIG. 5). Additionally, the flat insert panel 53 has a central raised retainer hub portion 55 that is surrounded by a lower level annular boss or flange 57 that is spaced outwardly from the hub 55 to contact the compact disc in the desired location.

Each of the raised corner bosses 52 is provided with a part annular land 54 that is formed at the interior edge of each corner boss 52. The lands 54 are raised slightly above the insert panel 53 and have substantially the same height as the surface of the annular boss or flange 57. The corner bosses 52 are also spaced inwardly slightly from the adjacent peripheral edges of the insert panel 53.

As can be seen in FIG. 2, a part cylindrical retaining shoulder surface 56 is formed on each corner boss 52. The radius of the part cylindrical surface on each corner boss 52 is slightly larger than the radius of the compact disc 59 (FIG. 5) which is to be received by the insert 50.

The outer peripheral surface of retainer hub 55 forms an interference fit with a normal bore opening 59A in compact disc 59. Inwardly directed recesses on the top of retainer hub 55 are provided to permit the periphery of the retainer hub 55 to compress slightly when a compact disc 59 is pressed onto the retainer hub 55 so that there are gripping and retaining forces holding the compact disc 59 in place.

The material for the insert 50 is preferably a clear moldable polymer such as PETG, or a polystyrene, and thus in FIG. 2 the edges of slots 38 can be seen.

The insert adapter 50 is quite flexible plastic, so that it can be bowed around a center line (see the dotted lines by insert 50 in FIG. 5) and two of the bosses 52 slide into the respective pockets 43 through slots 38 on one side of the base panel assembly 37, and the other two of the bosses 52 are slid into the other two pockets 43 through the respective slots 38 so that the insert 50 is positively retained within the compact disc package. The arrows in FIG. 5 illustrate this action.

The corner bosses 52 are projecting portions of the insert 50 in that they protrude out more from the central axis of hub 55 than the minimum cross dimension of the insert 50.

Figure 4:
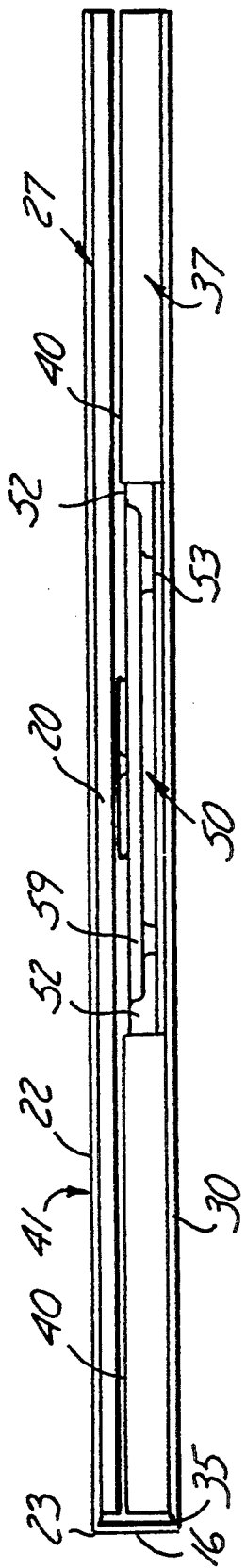
FIG. 4 is a side elevational view of the cover panel shown in position overlying a compact disc and the insert on the base panel assembly.

Once the insert 50 is placed into the compact disc package 41, the compact disc 59 is merely slipped onto the hub 55 and supported on the boss 57 and lands 54 and then the cover panel assembly 29, formed from the flat blank cover section 12, is folded along the fold lines 23 and 35 to overlie the compact disc as shown in FIG. 4. Note that the inner edge of the cover panel assembly is inset from fold line 23 for accommodating the thickness of the cover panel assembly when the compact disc package is closed as shown in FIG. 4. The cover panel assembly then overlies the compact disc.

The closed package then may be shrink wrapped for shipment. A tab may be placed across the edges that form the open edge of the closed package, opposite from edge panel 16 to hold the package closed, if desired.

It can be seen in FIGS. 2, 3, and 5 that the flat wall 53 comprises the center portion of the insert 50 and the bosses 52 are raised from this wall but still pass through the slots 38 and fit underneath the pocket forming sections 40 that form the pockets or recesses 43 after the inner base panel 28 has been folded over on top of the outer base panel 30, and the inner surface of outer base panel 30. In FIG. 5 it is shown that the inner and outer cover panels 20 and 22 may be left slightly spaced apart, to form a large pocket which permits insertion of a cover of a booklet or brochure from the side of the pocket adjacent the edge panel 16. An instruction book, advertising or the like can be secured by slipping a cover page into the pocket between the inner and outer cover panels and resting the booklet above the compact disc in the package.

As an alternative embodiment the outer cover panel 22 could have a flap on the outer edge of the panel that could be glued to the inner cover panel to close one end of the large pocket between the inner and outer cover panels. The large pocket between the inner cover panel 20 and outer cover panel 22 can then be used to hold a second compact disc if desired.

The inner cover panel 20 can be slit to permit a compact disc to be slipped at least partially into the large pocket formed in the cover panel assembly with a large enough portion of the compact disc within the pocket to be retained on the cover panel assembly. The entire surface of the flap 18 can be used for gluing the inner and outer cover panels together along the one edge of the outer cover panel 20.

Thus, by selecting the appropriate paper stock as is well known in the trade, a suitable paper board package for a compact disc can be formed and used in combination with a separate insert of light, flexible plastic that retains the compact disc in position on the insert. The insert is held securely by having the corner portions of the insert fit into pockets. The raised bosses 52 of the insert 50 help hold the assembly of the compact disc 59, insert 50, and the base panel assembly 37 of the compact disc package in proper orientation. Folding over the cover panel assembly 29 closes the compact disc package 41. The slots 38 and pockets 43 can be placed in various locations, and generally at least two slots and pockets are used. The pockets can be formed at any desired location around the insert, and the insert 50 can have different peripheral configurations. For example, the insert 50 could be circular with tabs protruding for insertion into retaining pockets on the compact disc package 41. The compact disc package 41 can be made with retainers for the insert on both the cover panel assembly and the base panel assembly so a double disc package can be formed. The edge panel 16 could be made wider for a double disc package, or made wider to accommodate a thick booklet above the compact disc.

The package shape and size and the retainer for the insert are easily customized to fit the requirements of the user. The compact disc package is cost effective and is recyclable. The plastic insert is separable for disposal. Water based adhesive is preferable, and when printed with vegetable based inks and varnishes, the package is 100% recyclable. The package is compact, flexible as to design and has a lower mailing cost, as compared to available compact disc packages.

Messages, instructions and art work can easily be printed on one surface of the flat blank layout shown in FIG. 1. Then when the cover and base panels are folded to position shown in FIG. 2 and as shown in FIG. 5, four printed panels are exposed when printing on the primary surface of the blank and it is accomplished by printing only one surface of the flat blank. The inner surface of the inner base panel 28 of base panel assembly 37 underneath the insert 50 can carry printed messages and art work because the insert 50 is made of a clear plastic so that legends, symbols or writing can be read through the insert 50.

The package shown can be used for holding a compact disc without the insert 50 if desired by providing a slit or opening leading to a pocket or recess for receiving a compact disc directly. The four panel construction that permits printing on one surface of the blank and folding so that four printed panels are exposed when folded lends itself to attractive and utilitarian use.

It should also be noted, as previously stated, that the large pocket in the cover panel assembly is of sufficient size to hold a second compact disc, if one edge of the pocket is closed, and the pockets on either the base or cover panel assemblies can be made large enough to hold a compact disc directly, without the insert. A longer access slot to the pockets would be used, and such slot or slit could be made diagonally across the inner cover or base panels. The compact disc can protrude partially out of the pocket and still be retained in such an arrangement.

Although the present invention has been described with reference to preferred embodiments, workers skilled in the art will recognize that changes may be made in form and detail without departing from the spirit and scope of the invention.

What is claimed is:

1. A compact disc package comprising:
    a base panel assembly;
    a cover panel assembly;
    an insert on the base panel assembly for retaining a compact disc;
    said base panel assembly having an overlying panel portion to form a pocket for receiving a portion of the insert and retaining such portion and the insert on the base panel assembly; and
    the cover panel assembly joined to the base panel assembly along one edge thereof such that the cover panel assembly can be folded over the base panel assembly and the insert retained on the base panel assembly.

2. The compact disc package of claim 1 wherein said base panel assembly and said cover panel assembly comprise paper board stock, and said base panel assembly and cover panel assembly are formed from a unitary paper board blank and joined to each other along one edge of each panel.

3. The compact disc package of claim 1, the package further comprising an edge panel integral with both the base panel assembly and the cover panel assembly and joined to the respective panel assemblies along fold lines, said edge panel having a width between the base panel assembly and the cover panel assembly that is sufficient to support the cover panel assembly and the base panel assembly generally parallel and overlying each other in a closed position with a space sufficient to accommodate a compact disc between the cover panel assembly and the base panel assembly.

4. The compact disc package of claim 1 wherein the insert has a periphery and has at least two projecting portions spaced apart around the periphery, and at least two pockets being formed on the base panel assembly to receive the two projecting portions.

5. The compact disc package of claim 4 wherein said base panel assembly comprises an inner base panel and an outer base panel of substantially the same size joined to each other along a base panel fold line, and the inner base panel being folded over the outer base panel along the fold line, said inner base panel having at least two slots therein to permit access to the pockets formed between the inner and outer base panels adjacent the periphery of the base panels, and means for securing the inner base panel to the outer base panel, with the inner base panel and the outer base panel being unattached adjacent the slots to form the pockets, said slots permitting access to said pockets, the insert being flexible so it can be bowed to move the projecting portions of the insert into the pockets through the slots.

6. The compact disc package of claim 5 wherein said cover panel assembly comprises an inner cover panel and outer cover panel joined to each other along a cover fold line, said inner cover panel and outer cover panel being folded to overlie each other to form the cover panel assembly and being secured to each other at least along one edge.

7. The compact disc package of claim 1 wherein the insert has a generally rectilinear periphery forming corners, and at least one of the corners forming the projecting portion on the insert.

8. The compact disc package of claim 1 wherein the insert is retained in position to overlie a major portion of the base panel assembly.

9. The compact disc package of claim 5, wherein the insert is substantially rectilinear and has four corner portions forming the projecting portions, the inner base panel having four slots opening to four pockets for receiving the four corner portions of the insert.

10. The compact disc package of claim 9 wherein the corner portion of the insert are bosses raised from a planar center portion of the insert.

11. The compact disc package of claim 2 wherein the cover panel assembly comprises a pair of cover panels folded to overlie each other and the base panel assembly comprises a pair of base panels folded to overlie each other, exposed surfaces of the base and cover panel assemblies being capable of having printing thereon, and the insert being transparent to permit features on the base panel underlying the insert to be viewed.

12. A paper board blank for a package for a recording medium comprising:
   a base section;
   a cover section;
   said cover section including a substantially rectangular inner cover panel and a substantially rectangular outer cover panel of substantially the same size and joined together along a first fold line;
   the base section including a substantially rectangular inner base panel and a substantially rectangular outer base panel joined together along a second fold line that is parallel with the first fold line;
   an edge panel joined to both the outer cover panel and the outer base panel on opposite edges of the edge panel along third and fourth fold lines, said edge panel defining a narrow width, the inner cover panel and inner base panel being adjacent and separated by a notch having substantially the same width as the edge panel; and
   wherein a slot is provided at each corner of said inner base panel such that each slot provides access to a corresponding pocket formed between the inner base panel and the outer base panel at each of the corners of the base section when the inner and outer base panels are folded to overlie each other.

13. The paper board blank of claim 12 further including:
   a cover glue flap on an edge of one cover panel opposite the first fold line, said cover glue flap being joined to the one cover panel along a cover flap fold line;
   a base glue flap joined to one base panel along a base flap fold line parallel with the cover flap fold line, said flaps being folded over along the cover flap and base flap fold lines, respectively, onto the respective cover panel and base panel, such that each of the flaps overlies the respective panel to which the one cover panel and one base panel is attached, and provides a surface to adhesively secure the one cover and base panels relative to the other cover and base panels, respectively.

14. The paper board blank of claim 12 wherein said edge panel has a width sufficient to permit the edge panel to support the edges of the base panel assembly and cover panel assembly spaced apart to permit a compact disc to be inserted between the base panel assembly and cover panel assembly without distorting the edge panel.

15. The paper board blank of claim 12, wherein said slots are part circular slots.

* * * * *

UNITED STATES PATENT AND TRADEMARK OFFICE
CERTIFICATE OF CORRECTION

PATENT NO.: 5,421,453

DATED: June 6, 1995

INVENTOR(S): Harrer et al.

It is certified that error appears in the above-identified patent and that said Letters Patent is hereby corrected as shown below:

Col. 1, line 9, "08/20/575" should be --08/201,575--.

Col. 1, lines 21/22, "in an all plastic boxes, known as a "jewel boxes", should be --in an all plastic box known as a "jewel box"--.

Signed and Sealed this

Twelfth Day of March, 1996

Attest:

BRUCE LEHMAN

Attesting Officer

Commissioner of Patents and Trademarks